May 31, 1955 P. A. RAICHE 2,709,279
METHOD OF MANUFACTURE OF FOUNTAIN SYRINGE
BAG WITH INTEGRAL GROMMET
Filed Dec. 18, 1952 2 Sheets-Sheet 1

INVENTOR.
Paul A. Raiche
BY Nathaniel Frucht
ATTORNEY

May 31, 1955

P. A. RAICHE 2,709,279

METHOD OF MANUFACTURE OF FOUNTAIN SYRINGE
BAG WITH INTEGRAL GROMMET

Filed Dec. 18, 1952

INVENTOR.
Paul A. Raiche
BY
Nathaniel Frucht
ATTORNEY

United States Patent Office 2,709,279
Patented May 31, 1955

2,709,279

METHOD OF MANUFACTURE OF FOUNTAIN SYRINGE BAG WITH INTEGRAL GROMMET

Paul A. Raiche, North Providence, R. I., assignor to Davol Rubber Company, a corporation of Rhode Island Application December 18, 1952, Serial No. 326,662

2 Claims. (Cl. 18—58.7)

The present invention relates to fountain syringes, and has particular reference to a novel construction for a flexible fountain syringe bag.

The principal object of the invention is to provide a dipped latex fountain syringe bag having an integral grommet.

Another object of the invention is to provide a fountain syringe bag with a heavy integral rubber grommet.

A further object of the invention is to provide a novel method for forming a heavy rubber grommet as an integral part of a dipped latex fountain syringe bag.

With the above and other objects and advantageous features in view, the invention consists of a novel method of manufacture and a novel integral article more fully disclosed in the detailed description following, in conjunction with the accompanying drawings, and more specifically defined in the claims appended thereto.

Figures 1, 2, 3, 4, 5:
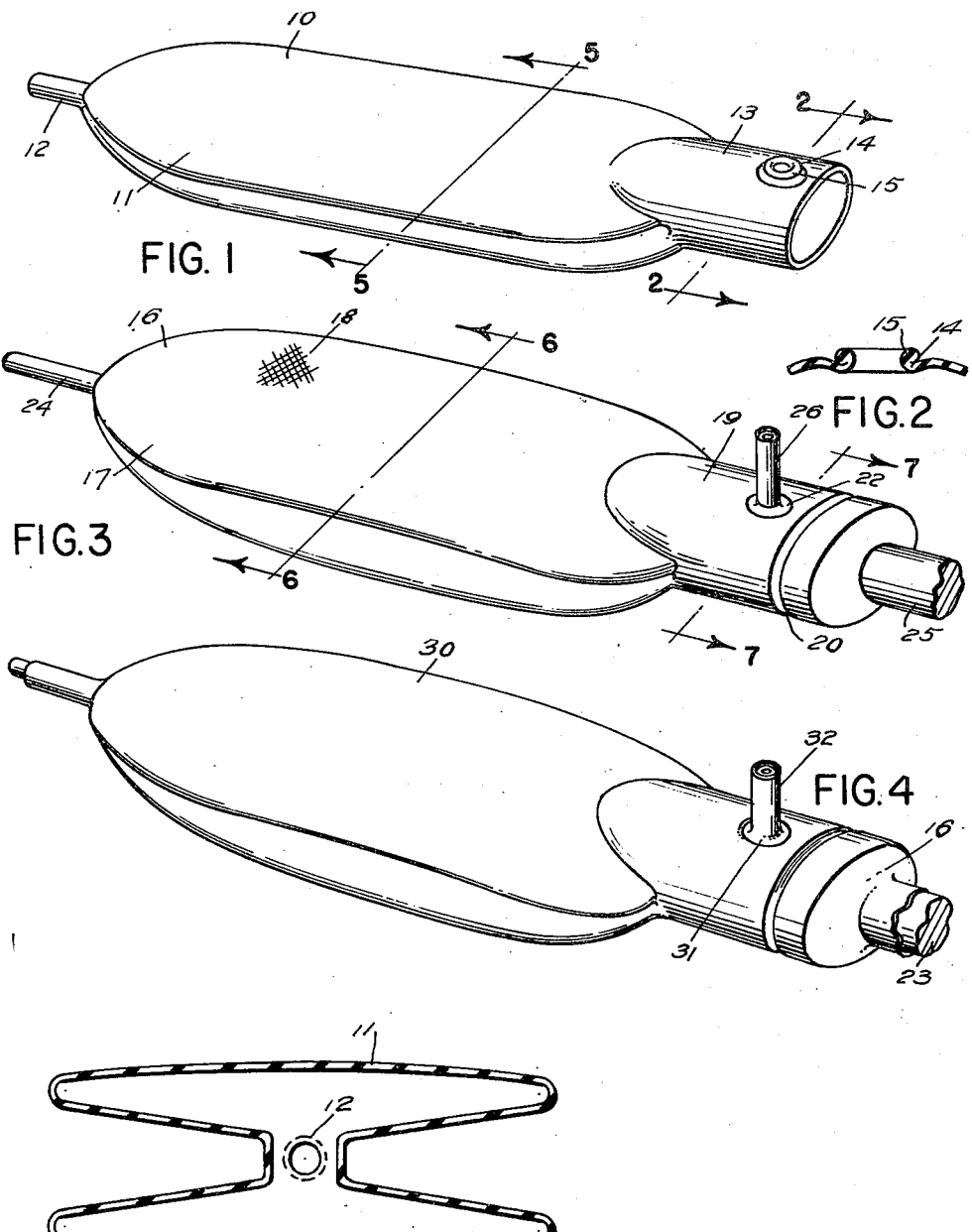
Fig. 1 is a perspective view of an illustrative fountain syringe bag embodying the invention.
Fig. 2 is an enlarged section on the line 2—2 of Fig. 1.
Fig. 3 is a perspective view of the former parts for the manufacture of the bag of Fig. 1.
Fig. 4 is a view of the former parts of Fig. 2 after dipping in latex or other rubber solution.
Fig. 5 is an enlarged section on the line 5—5 of Fig. 1.
Figure 6:
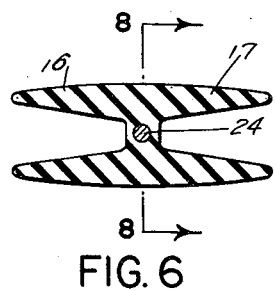
Fig. 6 is a section on the line 6—6 of Fig. 3.

It has been found desirable to provide a fountain syringe bag with an integral grommet of sufficient strength to support the bag, when filled, on a nail or other suitable holder. Such grommets have hitherto been made separately, of metal or the like, and mounted at the mouth of the bag, or have been made as part of a band cemented or otherwise secured to the mouth of the bag, thus providing a relatively weak construction at a relatively high manufacturing cost.

I have found it feasible to manufacture a fountain syringe bag with an integral grommet by dipping a bag form equipped with a detachable grommet forming cylinder, in latex or other suitable rubber or rubber substitute solution, to provide the bag with an upstanding tube which is then curled down to provide a grommet bead of substantial size and strength, the subsequent finishing operation such as curing integrating the parts together.

Referring to the drawings, the fountain syringe bag 10 includes the usual expansible bag portion 11, an outflow tube 12, and a cylindrical filling mouth portion 13, the mouth portion 13 having an integral grommet 14 in the form of a heavy annular bead 15, the bag being made of latex or other suitable natural or synthetic rubber, or of suitable plastic, if desired.

Figure 7:
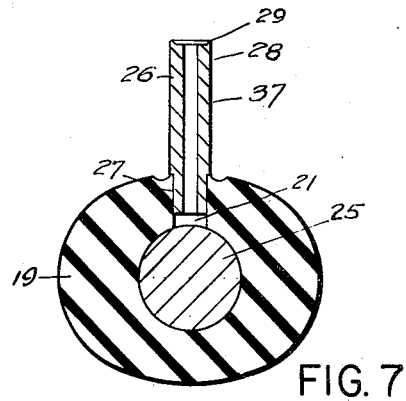
Fig. 7 is an enlarged section on the line 7—7 of Fig. 2.
Figure 8:
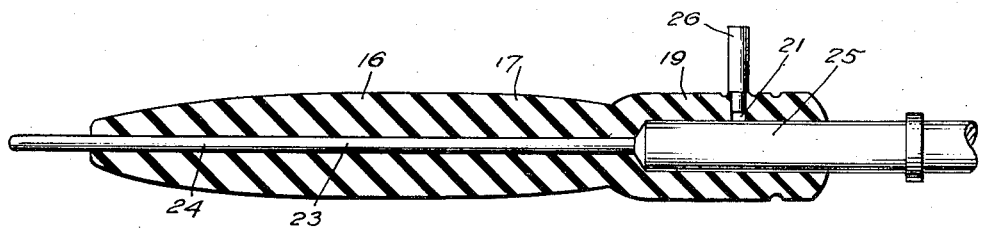
Fig. 8 is a section on the line 8—8 of Fig. 6.
Figure 11:
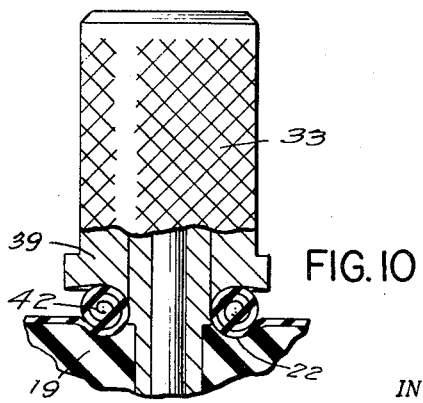
Fig. 11 is a perspective exploded view of the grommet tool parts.

The bag is preferably manufactured by dipping a form 16, see Fig. 3, into latex solution. The form 16 is made of suitable material, preferably heavy rubber, with a body portion 17 of generally H-shape, see Fig. 5, having its surfaces roughened with knurlings indicated by the reference numeral 18, and a mouth section 19 provided with an annular upper groove 20 and a grommet opening 21, see Fig. 7, the surface at the grommet opening 21 having an annular arcuate encircling recess 22. A removable elongated metal rod 23 extends through the form 16, with a lower portion 24 of narrow diameter which protrudes from the form as shown in Fig. 8, and a wider upper portion 25 which seats in the mouth section 19; a removable tubular metal plug 26, see Fig. 7, has a reduced lower end 27 to seat in the grommet opening 21, and has its upper end 28 recessed to provide a sharp annular edge 29.

Figure 9:
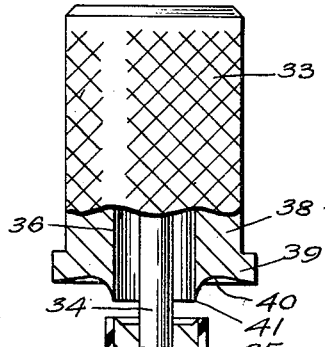
Fig. 9 is an enlarged view of the parts of Fig. 7 after dipping, with the grommet curling tool in position for curling the grommet.
Figure 10:
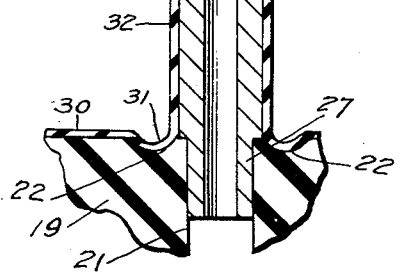
Fig. 10 is a view similar to Fig. 9, the parts being shown at the completion of the grommet curling operation.

Referring now to Figs. 4 and 9, the form 16, with its rod 23 and its metal plug 26 in place, is dipped in successively rubber solution and in coagulant solution in the usual manner to provide a coating 30 extending over the form and including a coating portion 31 extending into the annular recess 22 and a cylindrical coating portion 32 around the metal plug 26. A rolling tool 33 is now mounted on the metal plug 26, having a central depending pin 34 adapted to slide enter the bore 35 of the metal plug 26, a cylindrical recess 36 adapted to slide engage the outer surface 37 of the metal plug 26, and an outer cylindrical body 38 which has its lower end 39 of increased diameter and recessed and curved as indicated at 40 to provide a sharp annular edge 41 which strips the cylindrical coating portion 32 and rolls it down into the annular recess 22; the outer surface of the body 38 is preferably knurled as illustrated to facilitate the down thrust. The cylindrical coating portion 32 is thus rolled into a tight annular bead or ring 42, see Fig. 10, and a sturdy grommet results.

The coating and its annular ring are now cured, preferably by air-curling, and stripped from the form, whereby a one-piece flexible bag with an integral grommet results, the inner surfaces of the flexible bag being knurled to prevent contacting adhesion.

Although I have disclosed a specific method of manufacture and a specific fountain syringe by construction, it is obvious that the method of manufacture may be applied to other dipped rubber and rubber substitute articles, and that the size, shape, and arrangement of the bag parts may be varied for different bag uses, without departing from the spirit and the scope of the invention as defined in the appended claims.

I claim:

1. The method of forming an article having an integral grommet by dipping, comprising the steps of dipping a form having an upstanding cylindrical portion and an annular recess around the cylindrical portion into a solution of flexible material to provide a coating around the form and its upstanding cylindrical portion, rolling the coating around the upstanding cylindrical portion down into the recess into adhering contact with the coating around the form to provide a grommet, curing the coating and its grommet, and stripping the cured coating and its grommet from the form.

2. The method of forming a fountain syringe bag with an integral grommet, comprising the steps of dipping a form having a body portion, a mouth section, and a cylindrical rod upstanding in the mouth section and with an annular arcuate encircling recess therearound, into a solution of flexible material to provide a syringe bag coating around the form with a cylindrical coating around the upstanding cylindrical rod, rolling the cylindrical rod coating down into the recess into adhering contact with the syringe bag coating to provide a grommet, curing the bag coating and its grommet, and stripping the cured bag coating and its grommet from the form.

References Cited in the file of this patent

UNITED STATES PATENTS

| | | |
|---|---|---|
| 140,472 | Collins et al. | July 1, 1873 |
| 2,119,495 | Spanel | May 31, 1938 |
| 2,132,096 | Brueggeman | Oct. 4, 1938 |
| 2,206,438 | Trexler | July 2, 1940 |
| 2,313,792 | Winder | Mar. 16, 1943 |
| 2,315,576 | Auzion | Apr. 6, 1943 |
| 2,337,116 | Limbert | Dec. 21, 1943 |
| 2,429,869 | Crowley | Oct. 28, 1947 |
| 2,461,270 | Habib | Feb. 8, 1949 |
| 2,483,636 | Hardesty | Oct. 4, 1949 |
| 2,566,025 | Hauser | Aug. 28, 1951 |
| 2,568,128 | Morris | Sept. 18, 1951 |
| 2,670,502 | Cox | Mar. 2, 1954 |